United States Patent [19]
Hause

[11] 3,772,939
[45] Nov. 20, 1973

[54] THREE-SPEED SPLIT TORQUE TRANSMISSION
[75] Inventor: Gilbert K. Hause, Bloomfield Hills, Mich.
[73] Assignee: General Motors Corp., Detroit, Mich.
[22] Filed: Dec. 15, 1971
[21] Appl. No.: 208,078

[52] U.S. Cl................................. 74/677, 74/688
[51] Int. Cl............................................. F16h 47/08
[58] Field of Search.............................. 74/677, 688

[56] References Cited
UNITED STATES PATENTS

| | | | |
|---|---|---|---|
| 2,897,689 | 8/1959 | Waclawek | 74/677 X |
| 2,786,365 | 3/1957 | Lammerz | 74/677 |
| 2,905,025 | 9/1959 | Karlsson et al. | 74/677 |
| 2,908,190 | 10/1959 | Hause | 74/677 X |
| 2,919,604 | 1/1960 | DeLorean | 74/677 |
| 3,073,181 | 1/1963 | Kronogard | 74/677 |
| 3,180,180 | 4/1965 | Helfer et al. | 74/677 |

Primary Examiner—Manuel A. Antonakas
Assistant Examiner—Thomas C. Perry
Attorney—W. E. Finken et al.

[57] ABSTRACT

A transmission having a torque converter having a pump turbine and stator and a planetary gear unit having a long pinion meshing with a ring gear and meshing through a rear short pinion with a rear sun gear and through a front short pinion with a front sun gear. The torque converter turbine drives the pinion carrier. A reaction and drive shaft, connected to the rear sun gear and through a one-way freewheel device to the torque converter stator, is selectively driven by an input driven clutch and braked by the second speed brake. The front sun gear is connected to the first speed brake. The reverse brake holds the carrier. The ring gear drives the output shaft. The carrier has a central member and end plates with three sets of through pinion shafts for mounting the long pinions centrally between the two short pinions and connecting the carrier members together.

4 Claims, 6 Drawing Figures

INVENTOR.
Gilbert K. Hause
BY
a. m. Neiter
ATTORNEY

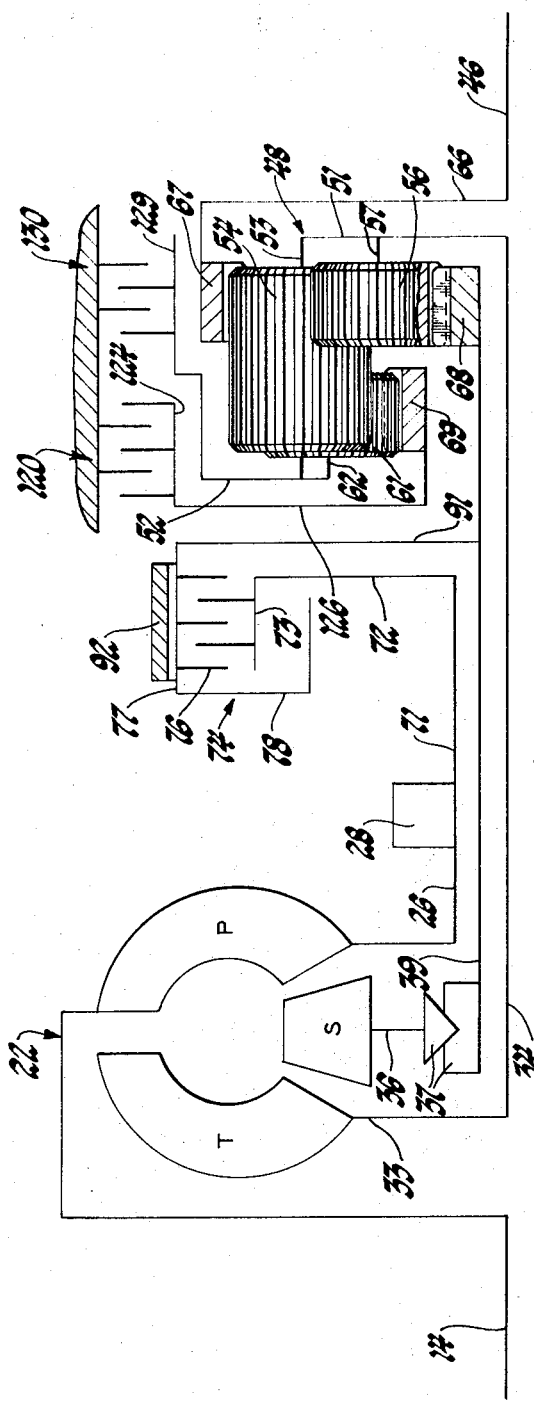

INVENTOR.
Gilbert K. Hause
BY
a. M. Neiter
ATTORNEY

THREE-SPEED SPLIT TORQUE TRANSMISSION

The invention relates to torque converter planetary gear unit transmissions and particularly to such transmissions having several torque converter operating phases and full and split torque operating phases.

This torque converter planetary gear unit transmission provides a simple compact arrangement for obtaining three gear ratios with full torque converter drive in first and second ratio and a split torque coupling drive in third ratio and a stator reverse ratio drive. The torque converter has a pump, a turbine and a stator having a one-way freewheel device. The planetary gear set has a long pinion meshing with a ring gear, a rear short pinion which in turn meshes with a rear sun gear and with a front short pinion which in turn meshes with the front sun gear. The torque converter turbine is connected to drive the carrier. A third speed clutch connects the input shaft to drive the rear sun gear for a lockup split torque high or third speed drive which also drives the stator at pump speed to provide operation in the positive coupling phase. For second speed, the clutch is disengaged and the brake engaged to hold the rear sun gear and the stator against reverse rotation for a full torque converter drive and an intermediate reduction ratio in the gearing. For first ratio the first or low brake holds the front sun gear which, with carrier input, provides a high torque multiplication low ratio drive to the ring gear output. In this ratio the stator rotates reversely at about one third of turbine speed and thus is stationary at torque converter stall and then moves slowly in a reverse direction. Thus, the torque converter provides full stall torque for starting and more rapidly decreasing torque multiplication with increasing speed ratio. The reverse rotation torque on the stator and turbine torque is combined in the gear set and with the low reaction through sun gear 69 provides a first speed output through ring gear 67.

An object of the invention is to provide a simplified improved three speed split torque converter and gear unit drive.

Another object of the invention is to provide a simplified improved three element torque converter and gear unit drive providing a split torque substantially one to one drive, and an intermediate reduction drive with normal torque converter drive and a low reduction drive with full torque multiplication at stall and a slightly increased reduction in torque multiplication with increasing speed ratio.

Another object of the invention is to provide in a torque converter planetary gear unit transmission a torque converter having a pump turbine and stator and a planetary gear unit having four elements to provide in a first ratio a high torque multiplication drive combining turbine and stator output torque and controlling stator reverse movement to provide full torque multiplication operation of the torque converter at stall, in a second intermediate torque multiplication drive, an intermediate torque multiplication in the gearing and in a third substantially normal torque converter operation and in a third substantially 1:1 drive about one third direct mechanical drive and two thirds coupling drive with the pump and stator of the torque converter positively locked.

These and other objects of the invention will be more apparent from the following specification and drawings in which:

FIG. 2 is a schematic representation of the transmission.

FIG. 3 is a chart showing the clutch and brakes applied in each speed ratio and the speed ratio values.

Figure 1:
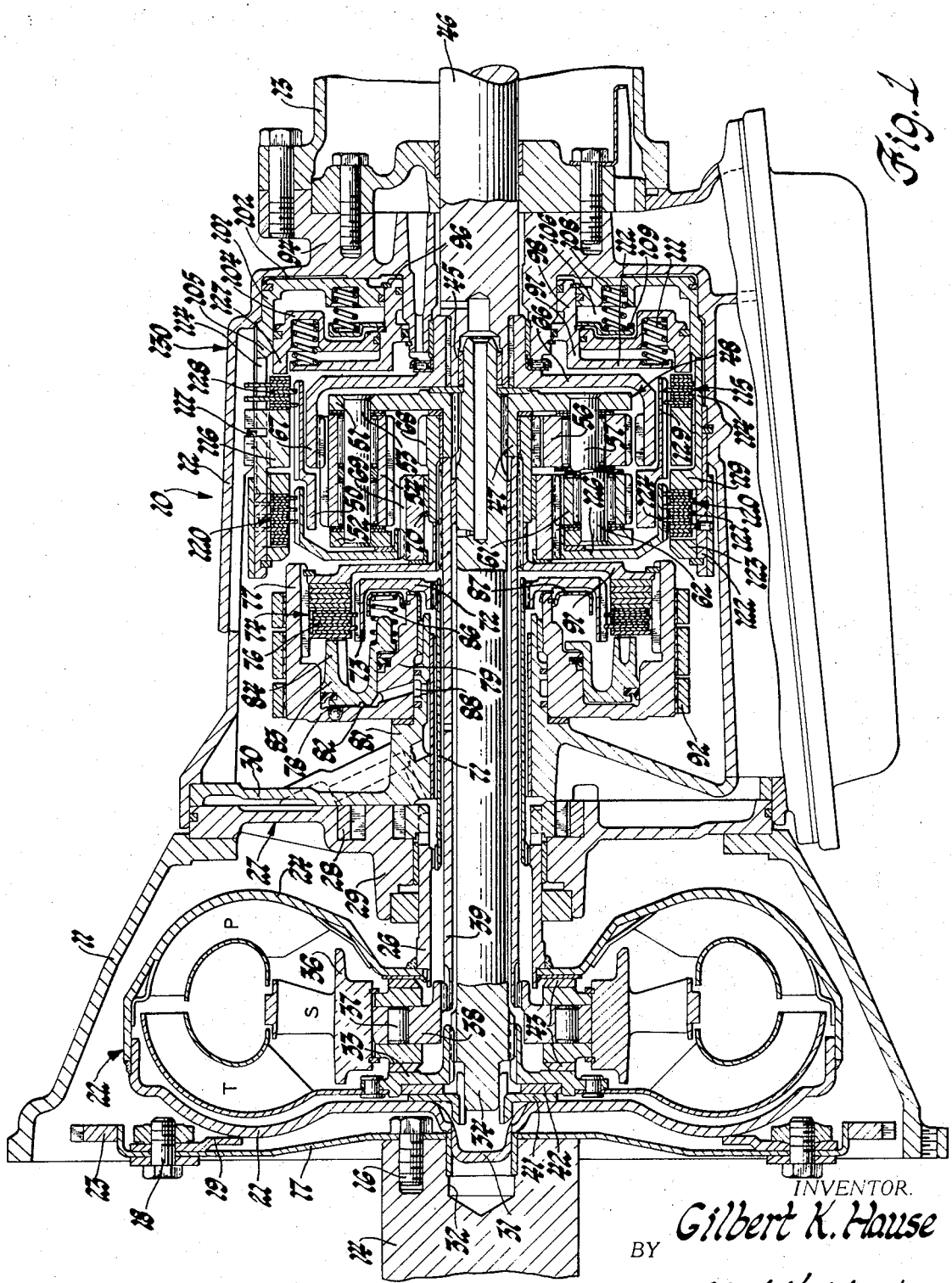
FIG. 1 is a longitudinal section with parts broken away to show details of the transmission.

The transmission shown in FIG. 1 has a transmission housing 10 having a bell portion 11 for the torque converter, a gear portion 12 and a tail portion 13. The engine output or transmission input shaft 14 is connected by suitable screw fasteners 16 to the flex plate drive disc 17 which has flexible spokes each connected by screws 18 to an anchor 19 which is welded to the cover 21 of the torque converter housing assembly 22. The flywheel gear 23 is welded to the outer perimeter of the flex plate 17. The rear wall portion 24 of the torque converter housing 22, a welded assembly, is drive spline connected to a sleeve shaft 26 rotatably mounted by a suitable bearing and sealed by a suitable seal in the transmission housing wall 27 and drives the control system fluid pump 28 located in the front part 29 of this wall and enclosed by the rear part 30 of this wall. The torque converter housing cover 21 has a pilot portion 31 mounted in the pilot bore 32 in the engine shaft 14. The pump blades P are fixed to the rear cover 24 of the torque converter housing and when rotated by the engine drive deliver fluid radially outward and axially to the turbine blading T mounted on hub 33 which is splined to the turbine output shaft 34. The fluid flow in the torque converter housing continues from the turbine blade to the stator blades S which are mounted on a hub 36 connected by the free wheel or one-way device 37 to an inner hub 38 which is splined to intermediate shaft 39 located between the turbine output shaft 34 and the pump drive sleeve shaft 26. A pilot bearing member 41 is welded to the inside of cover plate 21 to provide a pilot bearing for the reduced front end of the turbine output shaft 34. A thrust washer 42 is located between this member fixed to the cover and the turbine hub 33. Thrust bearing washers or surfaces 43 are located on each side of the stator hub and contact the turbine hub and the inside of the rear wall 24 of the torque converter housing to axially locate the torque converter ports. The turbine shaft 34 is piloted at its rear end in a bearing 45 in the front end of the output shaft 46.

The turbine shaft 34 is splined at its rear end to the hub portion 47 of rear annular member 51 of the carrier assembly 48. The carrier assembly includes an intermediate member 50, a rear annular member 51 on the hub 47 and front annular member 52 secured together by and supporting a plurality of pinion shafts as described in detail below and shown in FIGS. 3 to 5. The long pinion shafts 53 are fixed in the carrier assembly and have suitable bearings for rotatably supporting the long planetary pinions 54. Each long planetary pinion 54 meshes with a rear short planetary pinion 56 rotatably supported by suitable bearings on the rear short planetary pinion shaft 57 and also meshes with the front short planetary pinion 61 mounted by suitable bearings on the front short planetary pinion shaft 62. The output shaft 46 is splined to a disc 66 supporting the ring gear 67 meshing with the rear portion of the long planetary pinion. The intermediate shaft 39 is splined to a rear sun gear 68 which meshes with the rear short planetary pinion 56. A front sun gear 69 rotatably mounted by a bearing 70 on the spline portion of the rear sun gear meshes with the front short planetary pinion 61.

The input driven pump sleeve shaft 26 is splined to an extension sleeve shaft 71 extending through the pump wall 27 and splined to the hub 72 of the inner drum 73 of the clutch 74. The clutch 74 has a plurality of plates 76, the intermediate plates being splined to the inner clutch drum 73 and the alternate and end clutch plates being splined to the outer drum 77 which is formed as a part of the rotating cylinder member 78. The cylinder member 78 has an inner hub portion 79 and is mounted for rotation on a fixed sleeve member 81 formed as a portion of the intermediate wall 27 which encloses the transmission pump. The cylinder member 78 has an annular cylinder 82 reciprocally receiving the annular piston 83 which has an apply portion 84 engaging the adjacent plate. The retraction springs 86 mounted between a suitable abutment 87 fixed to the hub 79 of the cylinder member engages the piston to bias it to the retracted position. Fluid is supplied to the cylinder 82 by the suitable transfer passage 88 from the fixed sleeve 81. The drum 77 is drive connected by the driving disc 91 to the intermediate shaft 39. A fluid operated band type brake 92 engages the cylindrical external surface of the drum 77 and when operated by a suitable servo motor, not shown, holds the drum and the intermediate shaft and sun gear 68.

The rear wall 94 of the gear housing portion 12 has an annular chamber 96. The spring abutment member 97 has an inner cylindrical portion 98 fitting the inner diameter of cylinder 96 and secured by suitable means such as a snap ring and sealed at both ends by suitable seals as shown. The first piston 101 is reciprocally mounted in the cylinder 102 between the outer internal cylindrical surface of chamber 96 and the outer external cylindrical surface of the cylinder member 98 and has suitable sliding seals between these parts. An inner or second piston 104 has its outer diameter surface reciprocally mounted and sealed with respect to the inner diameter of the cylindrical outer skirt portion 105 of the first piston 101 and its inner diameter with respect to the cylindrical portion 98 of member 97 forming an operating chamber 106 between the pistons. Retraction springs 108 are located between the first piston and the first piston spring abutment ring 109 which is secured by a snap ring to the member 98 to limit movement away from the first piston in order to bias the first piston to the retracted position, as shown, furthest in the cylinder or chamber 102. The second set of retraction springs 111 is biased between the second piston 104 and the spring abutment portion 112 of member 97. The first piston 101 at its annular portion 105 engages a plurality of push rod members 114 which extend through an abutment member 116 splined and axially located by snap ring 117 to the housing 12. The push rod portions 114 have at their terminal end a pressure plate 119 engaging plates 121 of brake 120, the intermediate plates being splined to drum 122 fixed by abutment 116 to the housing 12 and carrying a backing plate 123 and the alternate plate being splined to a drum 124 connected by a disc 126 to the sun gear 69.

The second piston 104 has a pressure plate portion 127 engaging the plates 128 of brake 130 with intermediate plates splined to the transmission housing and alternate plates splined to the drum 129 which is a portion of the transmission carrier assembly.

Figure 4:
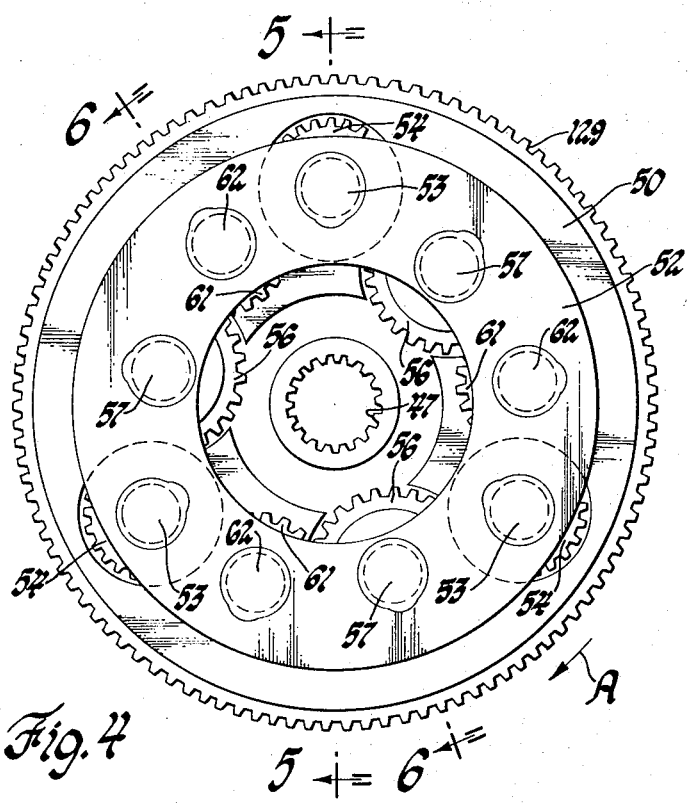
FIG. 4 is an end view of the carrier.
Figure 5:
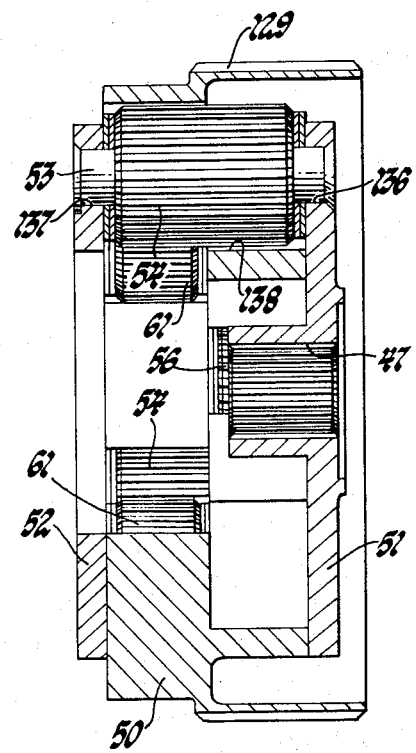
FIG. 5 is a section of FIG. 4 on the line 5—5.
Figure 6:
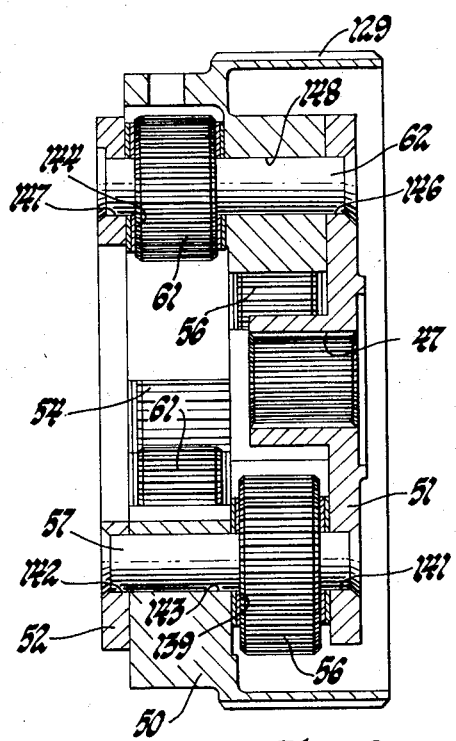
FIG. 6 is a section of FIG. 4 on the line 6—6.

The carrier assembly, shown in FIGS. 4, 5 and 6, has an intermediate member 50, a rear annular member 51 having hub 47 and a front annular member 52. In each of the three sets of pinions, the long pinion 54 is rotatably mounted on long pinion shaft 53 secured in apertures 136, 137 in plates 51 and 52 respectively. The long pinion is located in a circular cavity 138 extending completely through intermediate member 50. The rear short pinion is located in a circular cavity 139 in the rear side of intermediate member 50 and rotatably mounted on rear short pinion shaft 57 which is fixed in apertures 141, 142 in plates 51, 52 respectively and also fits in aperture 143 in the intermediate member 50 to secure the plates to the member. The rear short pinion 56, as shown in FIG. 4, is ahead of the long pinion, or meshed on the leading side of the long pinion with reference to the forward direction of rotation, arrow A. The front short pinion 61 is located in circular cavity 144 on the front side of member 50 and rotatably mounted on front short pinion shaft 62 similarly fixed in apertures 146, 147 in plates 51, 52 and aperture 148 in member 50, and also securing the plates and member together. The front short pinion 61 is meshed with the trailing side of long pinion 54 with reference to the forward direction of rotation, arrow A. The inner drum 129 of brake 130 is integral with, and extends from, the central portion of member 50 and is spaced from the rear portion of member 50.

Three forward speeds and reverse are obtained in the above described transmission when the clutch 74 and brakes 120, 92 and 130 are selectively applied by a suitable conventional hydraulic control system of the manual or automatic type in the sequence indicated by X in the spaced ratio shift chart, FIG. 3.

For low speed drive the low brake 120 is engaged to hold the front sun gear 69. The torque converter then drives through the turbine and turbine shaft 34 to rotate the carrier in the same direction for transmitting the drive from the carrier through the long pinion 54 to the output ring gear 67 and output shaft 46 while the reaction is from the long pinion through the front short pinion 61 to the sun gear 69 held by the low brake 120. Since the long pinion 54 also meshes with the rear short pinion 56 which meshes with the sun gear 68, the gearing rotates the sun gear 68, intermediate or first sleeve shaft 39 and free wheel device 37 slowly in a reverse direction relative to forward turbine and carrier rotation. The fluid reaction on the stator during torque multiplication holds the free wheel device engaged, so stator reaction torque is applied to sun gear 68 and the stator rotates, like sun gear 68, slowly in a reverse direction. The stator reaction torque and the turbine torque are combined in the gearing and delivered to the output ring gear. With a particular gear set providing the ratios shown in FIG. 3, the shaft 39 would rotate in a reverse direction at .364 of the forward turbine speed or a reverse rotation about one third of the forward turbine speed. This does not materially change torque converter performance in the high torque multiplication operating portion used in first ratio. The stator is stationary at stall, as one third of zero turbine speed zero so the normal stall torque ratio of about 2.3 to 1 is provided at stall. As the speed ratio, turbine or output speed divided by pump or input speed, increases from zero when turbine speed increases from zero, the stator speed increases at a positively controlled speed in relation to turbine speed, the torque multiplication ratio decreases proportionally with the increasing speed ratio a little more than with a stationary stator. The hydrostatic fluid flow in the torque converter exerts a torque on the stator S in a reverse direction which is transmitted by the free wheel device 37, shaft 39, rear sun gear 68 and long pinion 54 to the output ring gear 67 and output shaft 46, so the negative torque on the stator acts on the output ring gear and is grounded through front short pinion 61 and sun gear 69 to brake 120. Thus, reverse rotation of the stator is limited in relation to input and output speed of the planetary gear set and the fluid moment in the torque converter on the stator provides torque which is combined in the gearing to provide an output torque.

For second speed drive, the second speed band type brake 92 is engaged to hold the first sun gear 68 against rotation and the drive from the carrier through the long pinion 54 provides second speed drive and the reaction is transmitted from the long pinion through the rear short pinion 56 and sun gear 68 to the brake 92. The brake 92, since it holds intermediate shaft 39 from rotation also through free wheel device 37, holds the stator against any rearward rotation. The stall torque converter ratio in second is about 2.3 to 1. Full torque converter drive is thus provided in first and second speeds.

For high ratio the clutch 74 is engaged to drive the first or forward sun gear 69 by a direct mechanical connection from the engine shaft through the torque converter housing 24, pump sleeve shaft 26 and extension sleeve shaft 71 which is connected by the clutch 74 to the rear sun gear 68. The connect sleeve shafts 26 and 71 function as a second sleeve shaft. The torque converter drive through the turbine shaft 34 drives the carrier. When the high clutch 74 is engaged, there is a substantial 1:1 ratio drive with 0.367 of the drive mechanical and the remainder through the torque converter. Under these conditions the stator rotates at pump speed since the input driven sun gear 68 is also connected by shaft 39 to the stator. Thus the torque converter operates as a coupling. Accordingly, the shift to high for best efficiency is made while the torque converter is operating in the coupling stage or preferably just as it enters the coupling stage. Since rear sun gear 68 is mechanically driven 0.367 or about one third of the drive is mechanical and the remainder, about two thirds, is through the torque converter acting as a coupling for a split torque substantial 1:1 drive.

For reverse drive, the brake 115 is engaged to hold the carrier and the torque converter turbine through shaft 34. Then the stator operates to reversely drive the first sun gear 68 and through the long planetary pinions also reversely drive the ring gear 67 for reverse drive. Since the torque converter stator reverse drive provides a 1.3 to 1 torque multiplication ratio at stall the high reverse drive gear ratio 2.72 to 1 provides a sufficiently high overall reverse ratio 1.3 × 2.72 = 3.54.

The above described operation is summarized in the chart and indicates the ratios obtained in a preferred embodiment. The transmission may be operated by suitable conventional power shift and automatic speed responsive control systems which conventionally apply first, second and third clutches in forward drive and a reverse clutch in reverse drive.

It will be appreciated that the above disclosed preferred embodiment of the invention may be modified.

It is claimed:

1. In a transmission; an input member; an output member; a hydrokinetic torque converter having a pump drive connected to said input member, a turbine and a stator providing in response to drive of said pump in the torque converting phase output drive on said turbine and reaction drive on said stator and in the coupling phase substantially 1:1 drive with the turbine and stator rotating together; a turbine shaft drive connected to said turbine; a first shaft; free wheel drive means connecting said stator to said first shaft to prevent rotation of said stator reversely relative to said first shaft but to permit rotation of said stator member forwardly relative to said first shaft; a second shaft drive connected to said pump; planetary gear means having first, second and third central gears and a carrier drive connected to said turbine shaft and having rotatably mounted thereon pinions meshing with and drive connecting said central gears; said first central gear drive connected to said output member; said second central gear drive connected to said first shaft; clutch means for selectively connecting said second shaft to drive said first shaft and said second central gear for causing said pump and stator to rotate together for coupling phase torque converter drive and said gear means having said carrier driven by said turbine shaft and said second central gear driven by said pump providing about 1:1 split torque third drive to said first central gear; brake means to selectively hold said second central gear and said gear means having said carrier driven by said turbine shaft providing intermediate gear ratio second speed dribe to said first central gear and to hold said stator for a stationary stator torque converter drive; brake means to selectively hold said third central gear and said gear means having said carrier driven by said turbine shaft and said second central gear delivering torque to said first central gear and said second central gear rotating at a small proportion of carrier speed to limit the speed of rotation of said stator to a small proportion of turbine speed for a stationary stator torque converter drive at stall and a controlled rotating stator torque converter drive in a variable torque converting range; brake means to selectively hold said carrier and turbine for a stator reverse torque converter drive and said gear means with the carrier held and said second central gear driven by said stator providing a high reduction gear ratio reverse drive.

2. In a transmission; an input member; an output member; a hydrokinetic torque converter having a pump member drive connected to said input member, a turbine and a stator providing in response to drive of said pump output drive on said turbine and reaction drive on said stator; a turbine shaft drive connected to said turbine member; a first shaft; free wheel drive means connecting said stator to said first shaft to prevent rotation of said stator reversely relative to said first shaft but to permit rotation of said stator forwardly relative to said first shaft; a second shaft drive connected to said pump; a planetary carrier assembly drive connected to said turbine shaft having rotatably mounted thereon a long pinion and a first and a second short pinion each meshing with said long pinion of the carrier assembly; a ring gear meshing with said long pinion and drive connected to said output member; a first sun gear drive connected to said first shaft meshing with said first short pinion; a second sun gear meshing with said second short pinion; clutch means for selectively connecting said second shaft to drive said first shaft and first sun gear; brake means to selectively hold said first sun gear; brake means to selectively hold said second sun gear; brake means to selectively hold said carrier.

3. In a transmission; an input member; an output member; a hydrokinetic torque converter having a pump drive connected to said input member, a turbine and a stator providing in response to drive of said pump in the torque converting phase output drive on said turbine and reaction drive on said stator and in the coupling phase substantially 1:1 drive with the turbine and stator rotating together; a turbine shaft drive connected to said turbine; a first sleeve shaft surrounding said turbine shaft; free wheel drive means connecting said stator to said first sleeve shaft to prevent rotation of said stator reversely relative to said first sleeve shaft but to permit rotation of said stator forwardly relative to said first sleeve shaft; a second sleeve shaft surrounding said first sleeve shaft and drive connected externally to said pump; a planetary carrier assembly drive connected to said turbine shaft and having rotatably mounted thereon a long pinion and a first and a second short pinion each meshing with said long pinion; a ring gear meshing with said long pinion and drive connected to said output member; a first sun gear drive connected to said first sleeve shaft meshing with said first short pinion; a second sun gear meshing with said second short pinion; clutch means for selectively connecting said second sleeve shaft to drive said first sleeve shaft and first sun gear for causing the pump and stator to rotate together for coupling phase torque converter drive and about 1:1 split torque third drive; brake means to selectively hold said first sun gear and stator for a stationary stator torque converter drive and intermediate gear ratio second speed drive; brake means selectively hold said second sun gear for a stationary stator torque converter drive at stall and a reversely and reduced proportional to turbine speed rotating stator torque converter drive and low gear ratio first speed drive; brake means to selectively hold said carrier and turbine for a stator reverse torque converter drive and high reduction gear ratio reverse drive.

4. In a transmission; an input member; an output member; a hydrokinetic torque converter having a pump drive connected to said input member, a turbine and a stator providing in response to drive of said pump in the torque converting phase output drive on said turbine and reaction drive on said stator and in the coupling phase substantially 1:1 drive with the turbine and stator rotating together; a turbine shaft drive connected to said turbine; a first sleeve shaft surrounding said turbine shaft; free wheel drive means connecting said stator member to said first sleeve shaft to prevent rotation of said stator reversely relative to said first sleeve shaft but to permit rotation of said stator forwardly relative to said first sleeve shaft; a second sleeve shaft surrounding said first sleeve shaft amd drive connected externally to said pump; a planetary carrier assembly having a pair of side plates and an intermediate member having a long and two short pinion cavities drive connected to said turbine shaft and having rotatably mounted thereon a long pinion in the long pinion cavity and a first and a second short pinion in the short pinion cavities each meshing with opposite sides of said long pinion with reference to the direction of rotation of the carrier assembly during forward drive; a pinion shaft for each pinion extending through and securing said plates and intermediate member together; a ring gear meshing with said long pinion and drive connected to said output member; a first sun gear drive connected to said first sleeve shaft meshing with said first short pinion; a second sun gear meshing with said second short pinion; clutch means for selectively connecting said second sleeve shaft to drive said first sleeve shaft and first sun gear for causing the pump and stator to rotate together for coupling phase torque converter drive and about 1:1 split torque third drive; brake means to selectively hold said first sun gear and stator for a stationary stator torque converter drive and intermediate gear ratio second speed drive; brake means to selectively hold said second sun gear for a stationary stator torque converter drive at stall and rotating stator torque converter drive with the stator rotating reversely and at a small fractional proportion relative to turbine speed and low gear ratio first speed drive; brake means to selectively hold said carrier and turbine for a stator reverse torque converter drive and high reduction gear ratio reverse drive.

* * * * *

PO-1050
(5/69)

UNITED STATES PATENT OFFICE
CERTIFICATE OF CORRECTION

Patent No. 3,772,939　　　　　　　　Dated　November 20, 1973

Inventor(s)　Gilbert K. Hause

It is certified that error appears in the above-identified patent and that said Letters Patent are hereby corrected as shown below:

In the Specification: Column 3, line 39, "cylinder" should be -- cylindrical --; Column 4, line 64, insert -- is -- before the word "zero";

In the Claims: Column 6, claim 1, line 26, "lurbine" should be -- turbine --; Column 6, claim 1, line 32, "dribe" should be -- drive --; Column 8, claim 3, line 13, "amd" should be -- and --.

Signed and sealed this 16th day of July 1974.

(SEAL)
Attest:

McCOY M. GIBSON, JR.　　　　　　　C. MARSHALL DANN
Attesting Officer　　　　　　　　　Commissioner of Patents